Patented Feb. 3, 1942

2,271,970

UNITED STATES PATENT OFFICE 2,271,970

RECOVERY OF INDIUM

Homer M. Doran, Meryl A. Jackson, and Alfred I. Alf, Great Falls, Mont., assignors to Anaconda Copper Mining Company, New York, N. Y., a corporation of Montana No Drawing. Application October 7, 1940, Serial No. 360,128

7 Claims. (Cl. 75—109)

This invention relates to the treatment of indium-bearing solutions for the precipitation of indium therefrom, and has for its principal object the provision of an improved procedure for the precipitation of indium in metallic form from such solutions.

In processes for the production of metallic indium from indium-bearing materials, it is customary to leach the indium-bearing material with an acid or otherwise treat it in order to produce an aqueous indium-bearing solution. This solution is usually subjected to a series of treatments designed to eliminate impurities, and the resulting partially purified solution is treated with metallic zinc to precipitate the indium in metallic form. The metallic indium thus produced is briquetted and melted, usually under a cover of fused caustic soda to prevent contamination, and either is cast directly into pigs for the market, or is cast into anodes for further purification by electrolysis.

Although metallic zinc is an effective precipitant for indium, its use in commercial processes for the production of indium for the market is accompanied by a number of disadvantages. One of these disadvantages is that the indium sponge precipitated by metallic zinc often adheres quite closely to the zinc precipitant, and to separate the indium it must be scraped from the zinc sheet or strip on which it deposits. This involves scraping the zinc sheet or strip, and it is difficult to scrape all or substantially all of the indium from the sheet without at the same time scraping off some zinc. Any zinc thus scraped off alloys with the indium when the indium sponge is melted and constitutes an impurity in the cast indium product. A further disadvantage of the use of zinc as a precipitant is that under some conditions it leads to the precipitation of a very finely divided indium sponge which is difficult to briquette preparatory to melting, or even to melt directly.

The present invention provides, in a process involving treatment of an indium-bearing solution to precipitate indium therefrom, the improvement which comprises treating the solution with metallic aluminum in such manner as to cause a precipitate of metallic indium to be formed. By employing metallic aluminum as the precipitant for the indium, a very spongy indium precipitate is formed which does not adhere tightly to the aluminum precipitant and which therefore can be separated from the solution and from the precipitant without being contaminated to any appreciable extent by the aluminum. Indeed, if the aluminum precipitant is employed under conditions most favorable to speedy and effective indium precipitation, a sponge is obtained which floats to the surface of the solution and which may be readily skimmed therefrom, washed, and briquetted preparatory to melting.

The indium-bearing solution from which metallic indium is to be precipitated in accordance with the invention may be prepared in any suitable manner. For example, an aqueous indium-bearing solution may be obtained from an indium-bearing zinc calcine or zinc oxide fume, and may be suitably purified preparatory to precipitation of metallic indium, in the manner described in our copending application Serial No. 333,920, filed May 8, 1940. However, it is understood that the method of the present invention is equally applicable to the treatment of indium-bearing solutions otherwise obtained.

Prior to treatment of the indium-bearing solution with aluminum to precipitate the indium, the solution advantageously is rendered distinctly acid with sulphuric acid. This is particularly desirable if the indium-bearing solution is prepared, as is usually the case in commercial practice, from a zinciferous material and therefore contains some zinc in solution. In general the acidity of the indium-bearing solution preparatory to treatment with the metallic aluminum is adjusted to a value corresponding to about 100 to 150 grams per liter $H_2SO_4$. This adjustment of the acidity of the solution is in most cases accomplished by adding the indicated quantity of commercial aqueous sulphuric acid to the solution. Precipitation of the metallic indium generally proceeds most favorably with the solution acidified approximately to the degree stated.

It is advantageous to activate the solution preparatory to treatment with the metallic aluminum by adding to the solution an appreciable quantity of hydrochloric acid. Activation of the solution in this manner has the effect of materially increasing the speed with which the indium is precipitated by the aluminum. In the case of indium-bearing solutions prepared and purified for precipitation of the indium in accordance with the procedure described in our above-mentioned copending application Serial No. 333,920, and acidified with sulphuric acid in an amount corresponding to about 100 to 150 grams per liter $H_2SO_4$, the amount of hydrochloric acid added to activate the solution advantageously corresponds to about 3% by volume of commercial concentrated aqueous hydrochloric acid. For example, such a solution may be activated effectively by adding about 1.5 to 2 parts by volume of commercial concentrated (20–22° Bé.) aqueous hydrochloric acid to 45 parts by volume of the acid indium bearing solution.

The precipitation of metallic indium is effected by introducing metallic aluminum into contact with the solution. The metallic aluminum may be employed in any desired physical form, as, for example, wire shavings, granules, or the like, but ordinarily it is most convenient to employ relatively thin strips or sheets of metallic aluminum which are suitably immersed below the surface of the solution in the vessel in which precipitation is carried out. The aluminum displaces the indium from the solution, the latter generally being precipitated in the form of a sponge.

The solution in contact with the aluminum advantageously is heated to a temperature of the order of 70 to 80° C. in order to achieve rapid precipitation of the indium. At temperatures of 70 to 80° C. the reaction between the metallic aluminum and the indium in solution is very rapid and enough hydrogen is generated so that the metallic indium sponge formed is caused to separate from the aluminum and float to the surface of the solution. The sponge may then be skimmed or otherwise separated from the solution and may be briquetted by squeezing into desired shapes. The briquettes, after washing with water to remove excess acid, are melted, advantageously under a fused cover of caustic soda to prevent oxidation or other contamination of the indium from the atmosphere, and cast into shapes suitable either for the market or for further electrolytic purification.

A few precautions should be observed in employing metallic aluminum to precipitate indium from solutions. If the solution contains zinc, it is inadvisable to heat the solution to a temperature very much above 80° C. At such elevated temperatures the aluminum may cause precipitation of some zinc along with the indium and so yield a zinc-contaminated product.

It is sometimes advisable to adjust the concentration of indium in the solution at the start of the precipitation operation to a value not exceeding about 80 grams indium per liter. At higher concentrations, the indium may precipitate more as a plate than as a sponge. Once an indium plate is formed over the surface of the aluminum precipitant, the reaction slows down, and eventually will stop when the entire surface of the aluminum precipitant is thus covered. The indium plate then must be removed from the aluminum before further precipitation of indium can be carried out with the same precipitant. Ordinarily this deposition of the indium as a plate on the precipitant does not occur during precipitation of indium from the original indium-bearing solution. If, however, on account of the presence of undesirable impurities in the indium sponge at first produced, the sponge is redissolved and reprecipitated, the concentration of indium in the solution from which the reprecipitation is carried out should be carefully controlled so as not to exceed about 80 grams per liter.

By employing aluminum in accordance with the invention, rather than zinc as has heretofore been customary, to precipitate indium from solutions, the danger of debasing the indium precipitate with particles of zinc is avoided. It has been our observation that ordinarily no aluminum finds its way into the indium sponge. If it should, however, it would be eliminated upon melting the sponge under a cover of fused caustic soda, for aluminum is readily soluble in the hot caustic. The use of aluminum as the precipitant results in the production of an indium sponge having physical characteristics which makes it much easier to briquette, wash, and melt than is the case when a zinc precipitant is employed. Even if the original indium-bearing solution contains considerable quantities of zinc in solution, very little or none of this zinc is precipitated by the aluminum if the operating precautions described above are observed.

We claim:

1. In a process involving treatment of an aqueous indium-bearing solution to precipitate indium therefrom, the step which comprises treating the solution with metallic aluminum in such manner as to cause a substantially spongy precipitate of metallic indium to be formed.

2. In a process involving treatment of an aqueous indium-bearing solution to precipitate indium therefrom, the steps which comprise adjusting the acidity of the solution to a value corresponding to about 100 to 150 grams per liter $H_2SO_4$, and treating the solution with metallic aluminum in such manner as to cause a substantially spongy precipitate of metallic indium to be formed.

3. In a process involving treatment of an aqueous indium-bearing solution to precipitate indium therefrom, the steps which comprise heating the solution to a temperature of the order of about 70 to 80° C., and treating the solution with metallic aluminum in such manner as to cause a substantially spongy precipitate of metallic aluminum to be formed.

4. In a process involving treatment of an aqueous indium-bearing solution to precipitate indium therefrom, the steps which comprise activating the solution by adding thereto an appreciable quantity of hydrochloric acid, and treating the thus-activated solution with metallic aluminum in such manner as to cause a substantially spongy precipitate of metallic indium to be formed.

5. In a process involving treatment of an aqueous indium-bearing solution to precipitate indium therefrom, the steps which comprise adjusting the acidity of the solution to a value corresponding to about 100 to 150 grams per liter $H_2SO_4$, activating the solution by adding hydrochloric acid thereto in amount corresponding to about 3% by volume commercial concentrated aqueous hydrochloric acid, and treating the resulting activated solution with metallic aluminum in such manner as to cause a substantially spongy precipitate of metallic indium to be formed.

6. In a process involving treatment of an aqueous indium-bearing solution to precipitate indium therefrom, the steps which comprise adjusting the concentration of indium in the solution to a value not substantially exceeding about 80 grams indium per liter, and treating such solution with metallic aluminum in such manner as to cause a substantially spongy precipitate of metallic indium to be formed.

7. The method of recovering metallic indium from an indium-bearing solution which comprises adjusting the concentration of indium in the solution to a value not substantially exceeding about 80 grams indium per liter, adjusting the acidity of the solution to a value corresponding to about 100 to 150 grams per liter $H_2SO_4$, activating the solution by incorporating therein an appreciable quantity of hydrochloric acid, heating the solution to a temperature of the order of 70–80° C., treating the resulting solution with metallic aluminum, whereby metallic sponge indium is caused to precipitate from solution, and separating the sponge indium thus produced from the solution.

HOMER M. DORAN.
MERYL A. JACKSON.
ALFRED I. ALF.